(12) United States Patent
Amaral et al.

(10) Patent No.: US 10,791,837 B2
(45) Date of Patent: Oct. 6, 2020

(54) FLAT-SCREEN DISPLAY WALL MOUNT COVER

(71) Applicants: David Christopher Amaral, Charlotte, NC (US); Gregory Stuart Biddlecome, Charlotte, NC (US)

(72) Inventors: David Christopher Amaral, Charlotte, NC (US); Gregory Stuart Biddlecome, Charlotte, NC (US)

(\*) Notice: Subject to any disclaimer, the term of this patent is extended or adjusted under 35 U.S.C. 154(b) by 66 days.

(21) Appl. No.: 16/262,907

(22) Filed: Jan. 30, 2019

(65) Prior Publication Data

US 2019/0231073 A1 Aug. 1, 2019

Related U.S. Application Data

(60) Provisional application No. 62/623,607, filed on Jan. 30, 2018.

(51) Int. Cl.
*H04N 5/64* (2006.01)
*A47B 97/00* (2006.01)

(52) U.S. Cl.
CPC ............ *A47B 97/001* (2013.01); *H04N 5/64* (2013.01)

(58) Field of Classification Search
USPC ................ 135/143–144, 147, 151, 159, 119; 248/917, 918
See application file for complete search history.

(56) References Cited

U.S. PATENT DOCUMENTS

| | | | | |
|---|---|---|---|---|
| 3,810,482 A * | 5/1974 | Beavers | ............... | E04H 15/48 135/147 |
| 6,089,247 A * | 7/2000 | Price | ............... | E04H 15/48 135/145 |
| 6,776,179 B1 * | 8/2004 | Chen | ............... | E04H 15/42 135/135 |
| 7,178,539 B2 * | 2/2007 | Patel | ............... | E04H 15/50 135/131 |
| 7,703,469 B2 * | 4/2010 | Danziger | ............... | E04H 15/50 135/120.3 |
| 8,056,572 B2 * | 11/2011 | Livacich | ............... | E04H 15/001 135/115 |
| 8,869,814 B2 * | 10/2014 | Jin | ............... | E04H 15/34 135/115 |
| 2010/0006131 A1 * | 1/2010 | Liu | ............... | E04H 15/50 135/143 |

(Continued)

*Primary Examiner* — Alfred J Wujciak (57) ABSTRACT

A flat-screen display wall mount cover protects exposed cables and equipment behind a television or other mounted monitor. The apparatus is configured to be selectively permeable with respect to infrared signals and heat, while being impermeable to dust or harmful airborne particles. The apparatus includes a first flexible crossbar, a second flexible crossbar, a first display-bracing rod, a second display-bracing rod, a first wall-bracing rod, a second wall-bracing rod, and an opaque fabric cover. The first flexible crossbar and the second flexible crossbar are preferably hollow cylindrical units which support and arrangement the opaque fabric cover. Tension from the flexible crossbars allows the apparatus to conform to varying spaces behind a mounted monitor. The display-bracing rods support and position the opaque fabric cover by pressing against a monitor or television. The wall-bracing rods support and position the opaque fabric cover by pressing against the adjacent wall.

19 Claims, 6 Drawing Sheets

(56) References Cited

U.S. PATENT DOCUMENTS

| | | | |
|---|---|---|---|
| 2010/0243015 A1* | 9/2010 | Danziger | E04H 15/48 135/139 |
| 2011/0108079 A1* | 5/2011 | Mallookis | E04H 15/50 135/122 |
| 2015/0330099 A1* | 11/2015 | Zhou | E04H 15/48 135/143 |
| 2015/0376913 A1* | 12/2015 | Choi | E04H 15/50 135/147 |
| 2016/0108639 A1* | 4/2016 | Huang | E04H 15/322 135/144 |
| 2016/0348394 A1* | 12/2016 | Chen | E04H 15/42 |

* cited by examiner

FLAT-SCREEN DISPLAY WALL MOUNT COVER

The current application claims a priority to the U.S. Provisional Patent application Ser. No. 62/623,607 filed on Jan. 30, 2018.

FIELD OF THE INVENTION

The present invention generally relates to an electronics cover. More specifically, the present invention relates to a cover for protecting exposed cables, plugs, mounts, and wires on televisions that are mounted to a wall from dust and from visibility to users, thus creating a more visually-appealing appearance for the television. The present invention is configured to be selectively permeable with respect to infrared signals and heat, while being impermeable to dust or harmful airborne particles.

BACKGROUND OF THE INVENTION

Televisions have been a staple of home entertainment for the last several decades. From large vacuum tube television sets to newer smart televisions, televisions have been decreasing in weight and thickness over the years. Due to the lighter and thinner structures of modern televisions, mounting assemblies have been provided to allow televisions to be mounted onto different surfaces, such as walls or ceilings. In general, television mounts utilize assemblies which are secured to the back of the television and the exterior of the wall or ceiling. While the functionality of television mounts is beneficial and effective, oftentimes the ornamental impact of using a television mount can be frustrating. Because the television mount occupies a space between the wall/ceiling and the television, a large gap is left which can be very visible from any angle around the television. In addition, due to many cables, equipment, and adapters being connected to the back of the television from different devices, the gap behind the television leaves all those connections exposed and susceptible to dust accumulation. Methods to hide the mount assembly and cable connections behind the television are available, such as installing the television in a recessed opening on the wall/ceiling; however, most such methods require the user to modify the wall/ceiling. As a result, the whole process can be time consuming and expensive. Furthermore, recessing the television and equipment may not allow heat to escape, potentially causing damage to the equipment. What is needed is a cover which protects the gap between the television and wall/ceiling to hide and protect the television mount and cable connections without requiring modification of the structure of the television or the wall/ceiling.

The present invention addresses these issues. An objective of the present invention is to provide a television wall mount cover which can be installed behind a wall-mounted flat screen television to conceal cables, the wall mount, and other electronics behind the television. The present invention provides a cover which is installed behind a wall-mounted flat screen television to improve appearance and to protect the equipment from dust whilst allowing infrared remote-control signals to reach such equipment. Another objective of the present invention is to provide a television wall-mount cover which is easy to install, with optional versions that are fully adjustable and can accommodate various television sizes and various angles of mounting.

DETAILED DESCRIPTION OF THE INVENTION

All illustrations of the drawings are for the purpose of describing selected versions of the present invention and are not intended to limit the scope of the present invention.

Figure 1:
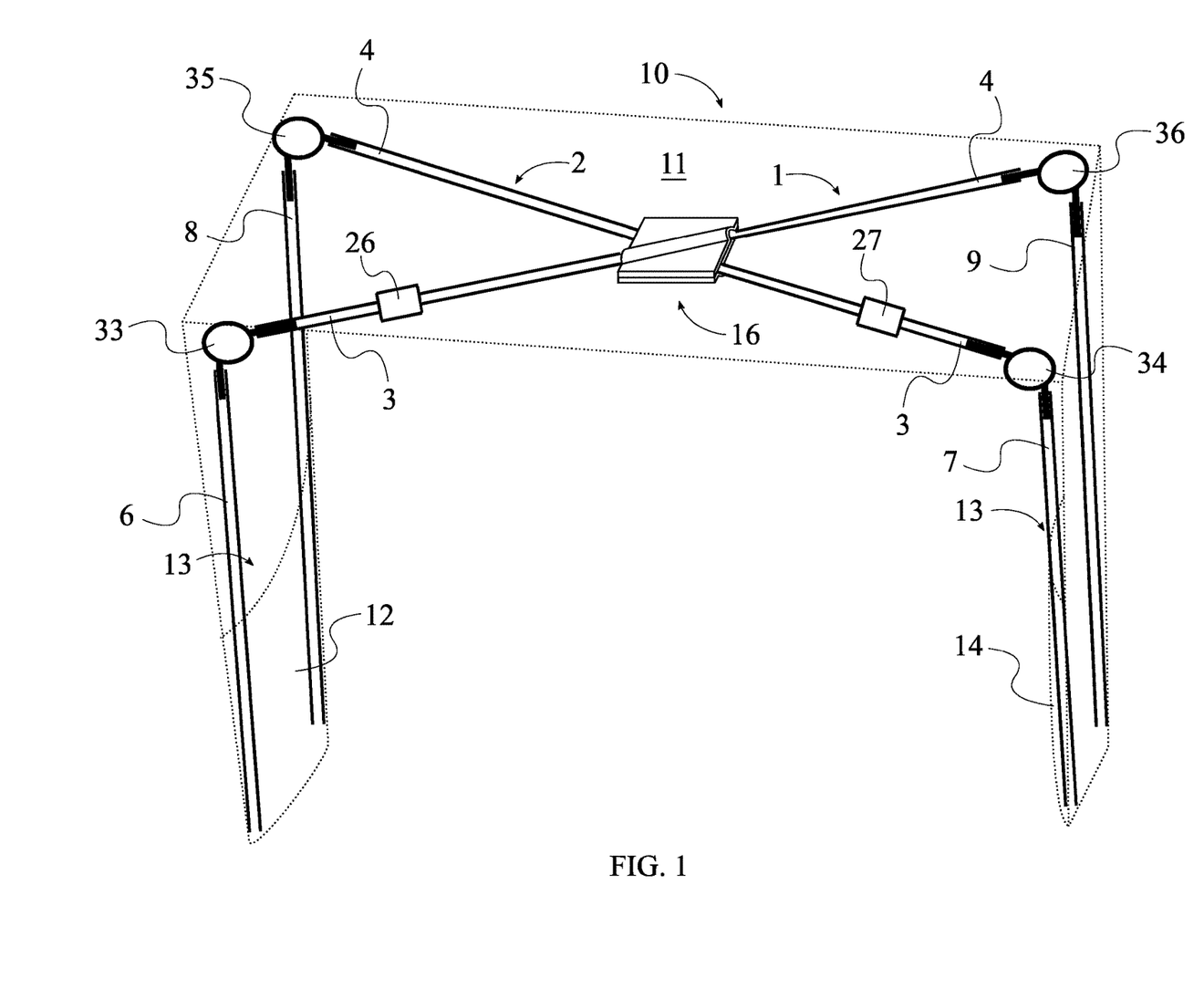
FIG. 1 is a front-right schematic view of the present invention.

The present invention is a flat-screen display wall mount cover that protects exposed cables and equipment behind a television or other mounted monitor. The present invention is configured to be selectively permeable with respect to infrared signals and heat, while being impermeable to dust or harmful airborne particles. The present invention comprises a first flexible crossbar 1, a second flexible crossbar 2, a first display-bracing rod 6, a second display-bracing rod 7, a first wall-bracing rod 8, a second wall-bracing rod 9, and an opaque fabric cover 10, as seen in FIG. 1. The first flexible crossbar 1 and the second flexible crossbar 2 are preferably hollow cylindrical units which allow for support and arrangement of the opaque fabric cover 10. The first display-bracing rod 6 and the second display-bracing rod 7 are cylindrical units which allow for improved support and positioning of the opaque fabric cover 10 by pressing against a monitor or television. The first wall-bracing rod 8 and the second wall-bracing rod 9 are cylindrical units which allow for improved support and positioning of the opaque fabric cover 10 by pressing against the adjacent mounting wall or surface. The opaque fabric cover 10 is a flexible, elastic cover which prevents the user from having to look observe the cords and equipment behind a monitor or television. The opaque fabric cover 10 further protects the present invention from damage due to dust and other harmful atmospheric particles and allows for accumulated heat to ventilate and for infrared signals, such as those commonly sent from television remotes and the like, to enter. In this way, the opaque fabric cover 10 does not interfere with the regular function of the television or monitor and their related components.

The general configuration of the aforementioned components allows the present invention to efficiently and effectively protect and cover the wires, cables, and other components of the monitor or television. The first flexible crossbar 1 and the second flexible crossbar 2 each comprise a proximal end 3 and a distal end 4. The proximal end 3 is the end nearest to the television or monitor. The distal end 4 is the end away from the monitor, against the adjacent mounting wall or surface. Moreover, the first flexible crossbar 1 and the second flexible crossbar 2 are arranged in a crisscross configuration. This arrangement allows the first flexible crossbar 1 and the second flexible crossbar 2 to adjust relative to each other in order to properly fit different gap widths. The first flexible crossbar 1 is laterally mounted to the second flexible crossbar 2. In this way, the first flexible crossbar 1 and the second flexible crossbar 2 function as one structural unit for supporting the opaque fabric cover 10. The proximal end 3 of the first flexible crossbar 1 is terminally and hingedly connected to the first display-bracing rod 6. Similarly, the proximal end 3 of the second flexible crossbar 2 is terminally and hingedly connected to the second display-bracing rod 7. This arrangement allows the first display-bracing rod 6 and the second display-bracing rod 7 to adjust to various monitor angles as required by the positioning of the first flexible crossbar 1 and the second flexible crossbar 2. These hinged connections for the first display-bracing rod 6 and the second display-bracing rod 7 may take the form of a ferrule-based attachment, a friction fit, or a variety of other connection mechanisms. The distal end 4 of the first flexible crossbar 1 is terminally and hingedly connected to the second wall-bracing rod 9. Similarly, the distal end 4 of the second flexible crossbar 2 is terminally and hingedly connected to the first wall-bracing rod 8. In this way, the first wall-bracing rod 8 and the second wall-bracing rod 9 are able to adjust to various monitor angles as required by the positioning of the first flexible crossbar 1 and the second flexible crossbar 2. Likewise, these hinged connections for the first wall-bracing rod 8 and the second display-bracing rod 9 may take the form of a ferrule-based attachment, a friction fit, or a variety of other connection mechanisms. The opaque fabric cover 10 is mounted across the first flexible crossbar 1, the second flexible crossbar 2, the first display-bracing rod 6, the second display-bracing rod 7, the first wall-bracing rod 8, and the second wall-bracing rod 9. The arrangement seen in FIG. 1 results in full enclosure of the left side, right side, and top space around a monitor or television.

Figure 2:
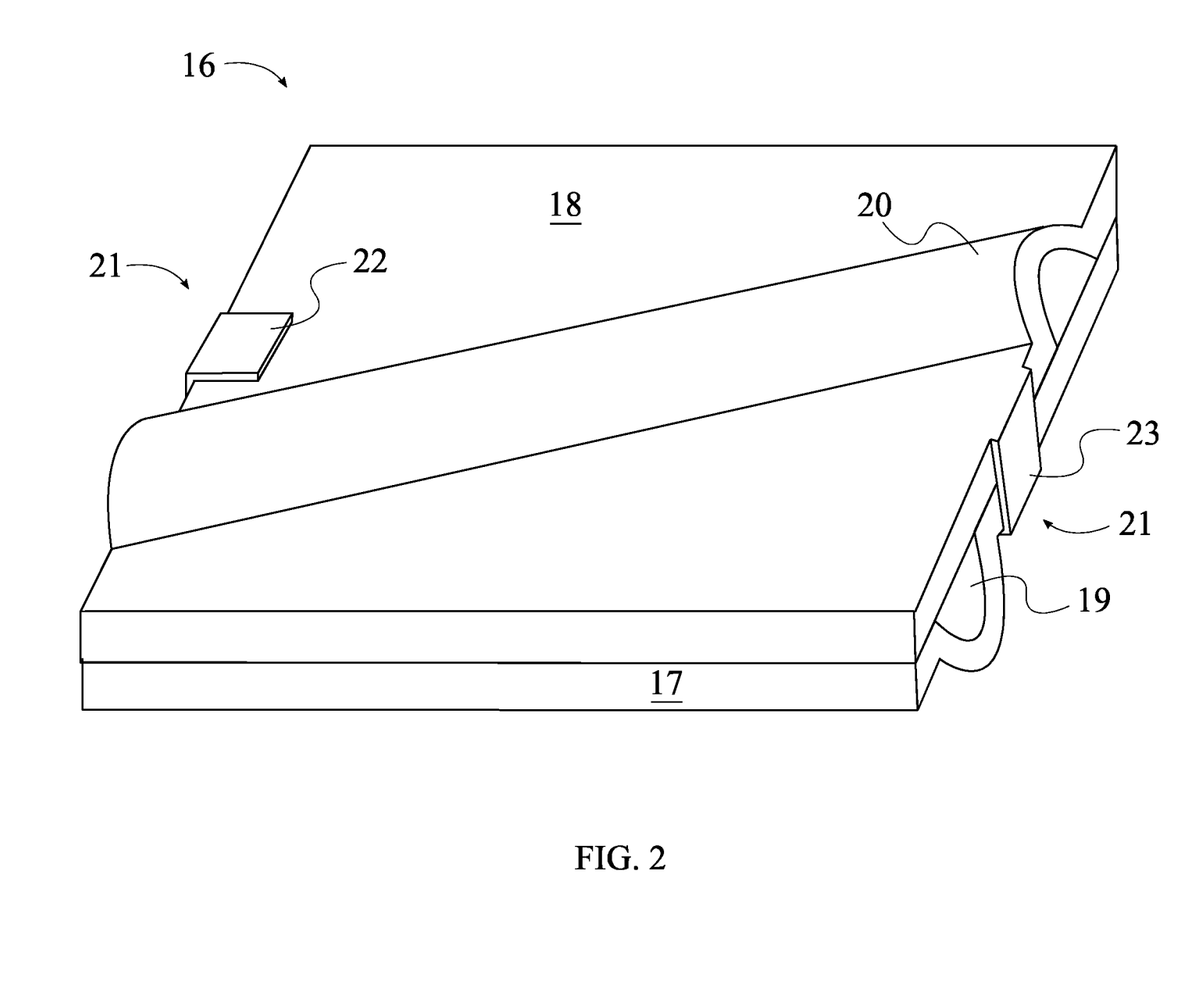
FIG. 2 is a front-right schematic view of the central brace of the present invention.

The present invention must be equipped to support the junction of the first flexible crossbar 1 and the second flexible crossbar 2. To this end, the present invention comprises a central brace 15. The central brace 15 is a unit which orients the first flexible crossbar 1 and the second flexible crossbar 2, appropriately, as seen in FIG. 2. The first flexible crossbar 1 and the second flexible crossbar 2 both further comprise a midpoint 5.

The midpoint 5 of the first flexible crossbar 1 and the second flexible crossbar 2 represents the bisecting point, effectively indicating the middle of the first flexible crossbar 1 and the second flexible crossbar 2. The midpoint 5 of the first flexible crossbar 1 and the midpoint 5 of the second flexible crossbar 2 are positioned adjacent to each other. In this way, the first flexible crossbar 1 and the second flexible crossbar 2 bisect each other. The midpoint 5 of the first flexible crossbar 1 and the midpoint 5 of the second flexible crossbar 2 are mounted within the central brace 15. This arrangement allows the central brace 15 to orient the first flexible crossbar 1 and the second flexible crossbar 2 in the crisscross configuration.

Furthermore, the central brace 15 comprises a first brace plate 16, a second brace plate 17, a first channel 18, a second channel 19, and a fastening mechanism 20, as seen in FIG. 2. The first brace plate 16 is a generally flat unit protects the first flexible crossbar 1. The second brace plate 17 is a generally flat unit protects the second flexible crossbar 2. The first channel 18 is a bent or curved section of the first brace plate 16, allowing for insertion and consequent orientation of the first flexible crossbar 1. The second channel 19 is a bent or curved section of the second brace plate 17, allowing for insertion and consequent orientation of the second flexible crossbar 2. The fastening mechanism 20 is a connective unit that joins the first brace plate 16 to the second brace plate 17. The first channel 18 is diagonally integrated across the first brace plate 16. This allows for proper orientation of the first flexible crossbar 1. Similarly, the second channel 19 is diagonally integrated across the second brace plate 17. This allows for proper orientation of the first flexible crossbar 1. The first channel 18 and the second channel 19 are arranged in a crisscross configuration. In this way, the first flexible crossbar 1 and the second flexible crossbar 2 can be oriented at an angle from each other. The first brace plate 16 is mounted across the second brace plate 17 by the fastening mechanism 20. The fastening mechanism 20 secures the first brace plate 16 to the second brace plate 17 during assembly of the present invention. The first flexible crossbar 1 is positioned through the first channel 18. Similarly, the second flexible crossbar 2 being positioned through the second channel 19. In this way, the midpoint 5 of the first flexible crossbar 1 and the midpoint 5 of the second flexible crossbar 2 overlap each other.

The fastening mechanism 20 may take on one of several forms. In one exemplary embodiment, the fastening mechanism 20 is a permanent connection, such as a spot weld. This arrangement would prevent separation of the first brace plate 16 from the second brace plate 17 upon setup. In another embodiment, the fastening mechanism 20 comprises at least one first malleable tab 21 and at least one second malleable tab 22, as seen in FIG. 2. The at least one first malleable tab 21 and the at least one second malleable tab 22 are both connectors that fold to secure in place. The at least one first malleable tab 21 is peripherally connected to the first brace plate 16. Furthermore, the at least one first malleable tab 21 is crimped onto the second brace plate 17. This arrangement allows the first brace plate 16 to secure to the second brace plate 17. The at least one second malleable tab 22 is peripherally connected to the second brace plate 17. Furthermore, the at least one second malleable tab 22 is crimped onto the first brace plate 16. This arrangement allows the second brace plate 17 to secure to the first brace plate 16.

Figure 3:
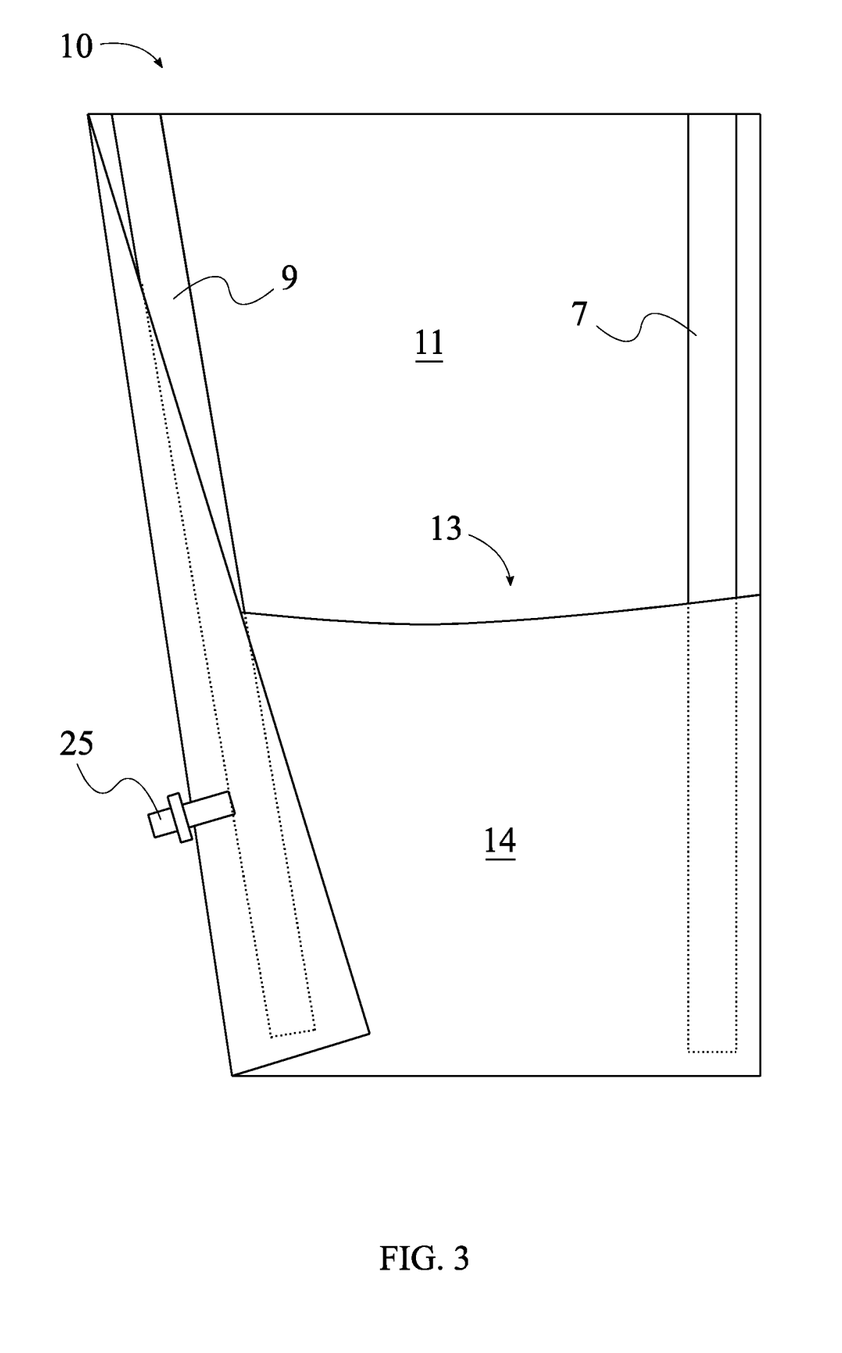
FIG. 3 is a left schematic view of the opaque fabric cover of the present invention.
Figure 4:
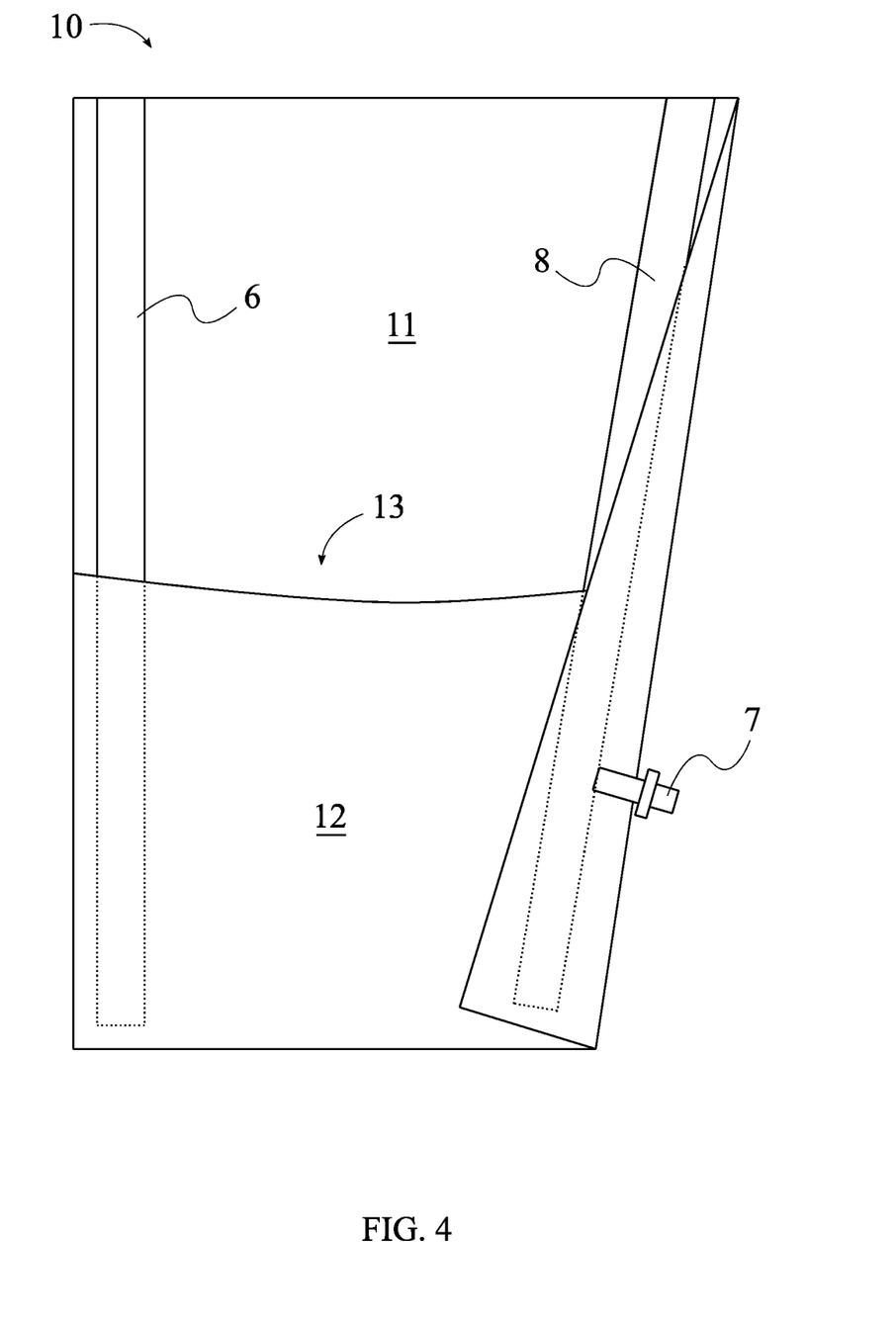
FIG. 4 is a right schematic view of the opaque fabric cover of the present invention.

The opaque fabric cover 10 provides the primary protection for cables and cords that are exposed behind a monitor. The opaque fabric cover 10 comprises a canvas body 11, a first pocket 12, and a second pocket 14. The canvas body 11 stretches over the first flexible crossbar 1, the second flexible crossbar 2, the first display-bracing rod 6, the second display-bracing rod 7, the first wall-bracing rod 8, and the second wall-bracing rod 9. The first pocket 12, as seen in FIG. 4, ensures that the canvas body 11 covers one end of the gap behind a monitor or television, while the second pocket 14, as seen in FIG. 3, ensures that the canvas body 11 covers the opposite end of the gap behind a monitor or television. The first pocket 12 and the second pocket 14 each comprise an opening 13, which allows for insertion of items into the first pocket 12 or the second pocket 14. The first pocket 12 is connected across the canvas body 11. Similarly, the second pocket 14 is connected across the canvas body 11. In this way, the first pocket 12 and the second pocket 14 span the width of the canvas body 11. The first pocket 12 and the second pocket 14 are positioned opposite to each other along the canvas body 11. This arrangement allows the first pocket 12 and the second pocket 14 to hold their respective items on opposite ends of the canvas body 11. The opening 13 of the first pocket 12 and the opening 13 of the second pocket 14 are oriented towards each other. In this way, the first pocket 12 and the second pocket 14 are oriented to respectively receive the first display-bracing rod 6, the second display-bracing rod 7, the first wall-bracing rod 8, and the second wall-bracing rod 9. The first display-bracing rod 6 and the first wall-bracing rod 8 traverse into the first pocket 12. This arrangement ensures that the side of the monitor or television next to the first display-bracing rod 6 and the first wall-bracing rod 8 is covered by the opaque fabric cover 10. The second display-bracing rod 7 and the second wall-bracing rod 9 traverse into the second pocket 14. This arrangement ensures that the side of the monitor or television next to the second display-bracing rod 7 and the second wall-bracing rod 9 is covered by the opaque fabric cover 10.

The opaque fabric cover 10 may have unsightly excess material from the first pocket 12 and the second pocket 14 that needs to be tucked away. To this end, the present invention comprises a first width-reducing clip 23, as seen in FIG. 4. The first width-reducing clip 23 is a fastener that secures any excess pocket material so that such material does not hang loosely from the first pocket 12. The first width-reducing clip 23 is laterally clamped onto the first pocket 12. This arrangement ensures that the excessive fabric is held out of sight from a by-passer. Similarly, the present invention comprises a second width-reducing clip 24, as seen in FIG. 3. The second width-reducing clip 24 is a fastener that secures any excess pocket material so that such material does not hang loosely from the second pocket 14. The second width-reducing clip 24 is laterally clamped onto the second pocket 14. This arrangement ensures that the excessive fabric is also held out of sight from a by-passer.

Figure 5:
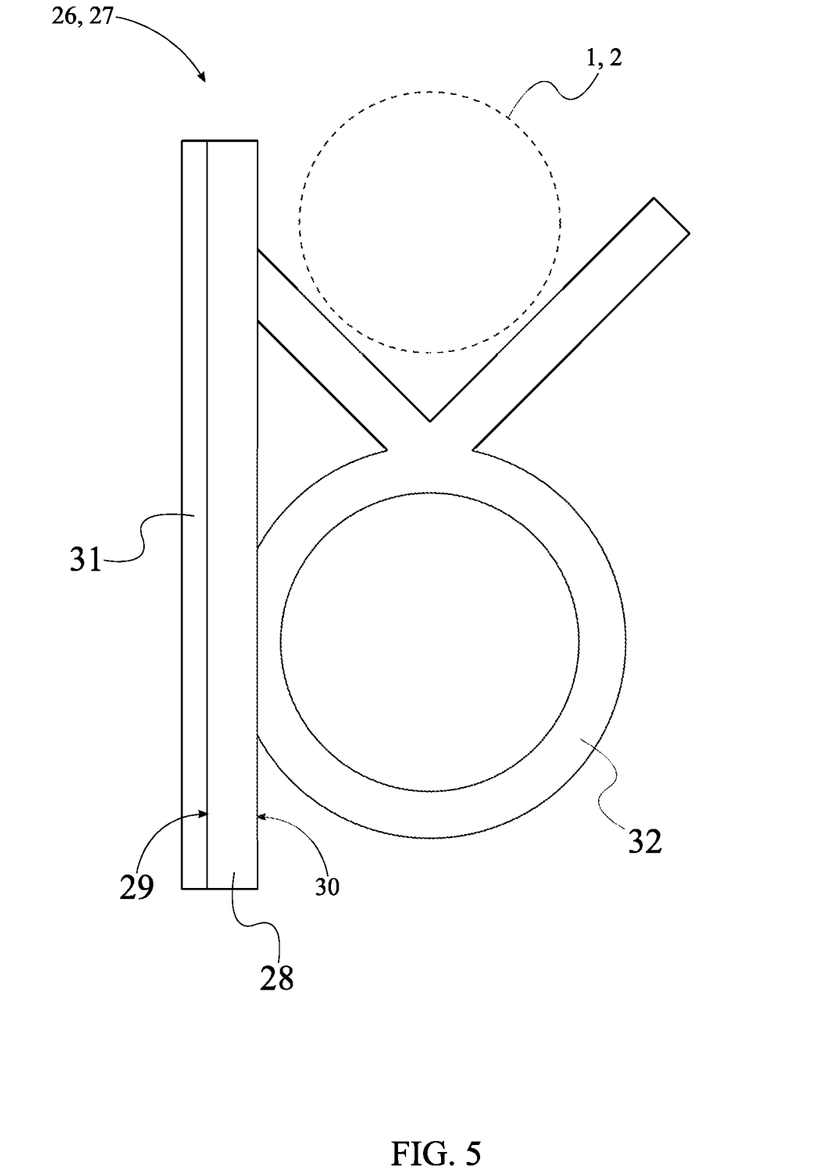
FIG. 5 is a schematic view of a display-attaching clip of the present invention.

The present invention requires a limited amount of configuration during setup, and in order to support the first flexible crossbar 1 and the second flexible crossbar 2 in position. To this end, the present invention comprises a first display-attaching clip 25 and a second display-attaching clip 26, as seen in FIG. 5. The first display-attaching clip 25 and the second display-attaching clip 26 are connectors that arrange the first flexible crossbar 1 and the second flexible crossbar 2 appropriately for use relative to a television or monitor. The first display-attaching clip 25 is braced against the first flexible crossbar 1. Similarly, the second display-attaching clip 26 is braced against the second flexible crossbar 2. In this way, both the first display-attaching clip 25 and the second display-attaching clip 26 provide support for the present invention against the monitor or television. The first display-attaching clip 25 and the second display-attaching clip 26 are positioned offset from each other. This arrangement allows the present invention to be more evenly supported in between the first display-attaching clip 25 and the second display-attaching clip 26.

Furthermore, the first display-attaching clip 25 and the second display-attaching clip 26 each comprise a clip panel 27, an adhesive 30, and a crossbar support 31, as seen in FIG. 5. The clip panel 27 is a flat or lightly-curved wide extrusion. The adhesive 30 is any of a number of glues or epoxies that allows for connection of the first display-attaching clip 25 and the second display-attaching clip 26 to the back of a monitor or television. The crossbar support 31 is a protrusion that extends to allow for gravitational support of the first flexible crossbar 1 or the second flexible crossbar 2. The clip panel 27 comprises a proximal panel face 28 and a distal panel face 29. The proximal panel face 28 is a surface of the clip panel 27 that contacts a monitor or television. The distal panel face 29 is the surface facing generally away from the monitor or television. The adhesive 30 is applied across the distal panel face 29. In this way, the distal panel face 29 is equipped to stick to a monitor or television. The crossbar support 31 is connected onto the proximal panel face 28. This arrangement allows the crossbar support 31 to extend generally away from the monitor. The first flexible crossbar 1 is situated upon the crossbar support 31 of the first display-attaching clip 25. In this way, the first flexible crossbar 1 is supported by the monitor or television through the first display-attaching clip 25. Similarly, the second flexible crossbar 2 is situated upon the crossbar support 31 of the second display-attaching clip 26. In this way, the second flexible crossbar 2 is supported by the monitor or television through the second display-attaching clip 26.

The opaque fabric cover 10 seen in FIG. 1 is specially-made with respect to several properties including and beyond dust protection in order to improve the performance of contained electrical components. In some embodiments, the opaque fabric cover 10 is permeable to infrared radiation. This arrangement allows signals, particularly those between a remote control and a set-top box, to pass undisturbed by the presence of the opaque fabric cover 10. In some embodiments, the opaque fabric cover 10 is made of a ventilative fabric. The resultant heat permeability results in undisturbed heat dissipation from electrical equipment behind the monitor or television. The properties of elasticity, dust protection, infrared permeability, ventilations, and combinations thereof result in an opaque fabric cover 10 that protects all of the connections and components behind the monitor while improving their performance.

Figure 6:
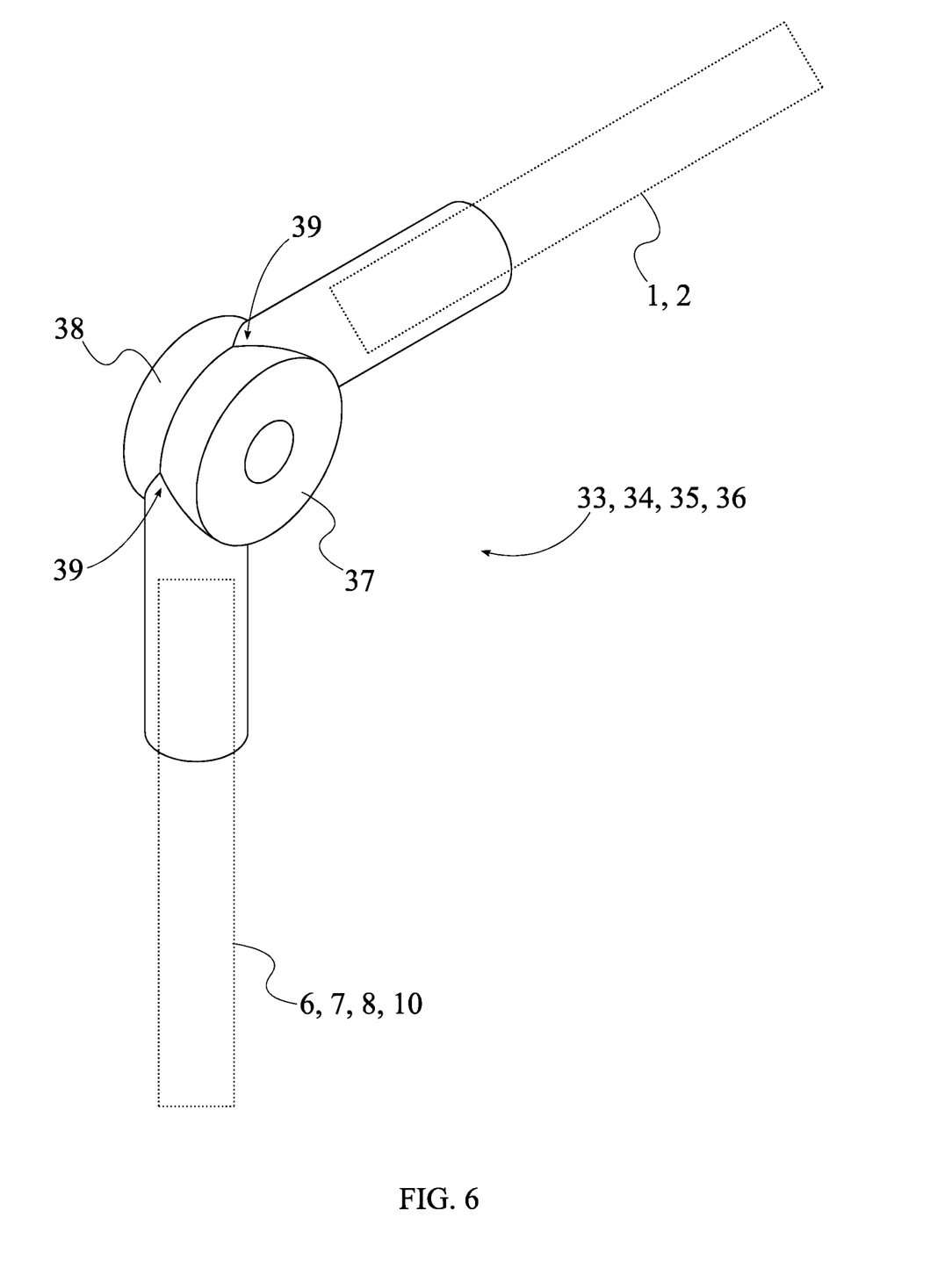
FIG. 6 is a schematic view of a banjo hinge of the present invention.

In order to arrange the opaque fabric cover 10 appropriately behind variably-sized, often uneven spaces behind a monitor, the first display-bracing rod 6, the second display-bracing rod 7, the first wall-bracing rod 8, and the second wall-bracing rod 9 must be able to pivot relative to the first flexible crossbar 1 and the second flexible crossbar 2. To this end, the present invention further comprises a first banjo hinge 32, a second banjo hinge 33, a third banjo hinge 34, and a fourth banjo hinge 35, as seen in FIG. 6. The first banjo hinge 32, the second banjo hinge 33, the third banjo hinge 34, and the fourth banjo hinge 35 are connectors that allow for rotatable connection of the first display-bracing rod 6, the second display-bracing rod 7, the first wall-bracing rod 8, and the second wall-bracing rod 9 relative to the first flexible crossbar 1 and the second flexible crossbar 2. The first banjo hinge 32 is operatively integrated into the hinged connection between the proximal end 3 of the first flexible crossbar 1 and the first display-bracing rod 6, wherein the first banjo hinge 32 is used to increase torsional stiffness while adjusting an angle between the first flexible crossbar 1 and the first display-bracing rod 6. The second banjo hinge 33 is operatively integrated into the hinged connection between the proximal end 3 of the second flexible crossbar 2 and the second display-bracing rod 7, wherein the second banjo hinge 33 is used to increase torsional stiffness while adjusting an angle between the second flexible crossbar 2 and the second display-bracing rod 7. The third banjo hinge 34 is operatively integrated into the hinged connection between the proximal end 3 of the second flexible crossbar 2 and the first wall-bracing rod 8, wherein the third banjo hinge 34 is used to increase torsional stiffness while adjusting an angle between the second flexible crossbar 2 and the first wall-bracing rod 8. The fourth banjo hinge 35 is operatively integrated into the hinged connection between the proximal end 3 of the first flexible crossbar 1 and the second wall-bracing rod 9, wherein the fourth banjo hinge 35 is used to increase torsional stiffness while adjusting an angle between the first flexible crossbar 1 and the second wall-bracing rod 9. This arrangement allows for firm but adjustable positioning of the first display-bracing rod 6, the second display-bracing rod 7, the first wall-bracing rod 8, and the second wall-bracing rod 9 relative to the first flexible crossbar 1 and the second flexible crossbar 2.

In order to function properly, the first banjo hinge 32, second banjo hinge 33, third banjo hinge 34, and fourth banjo hinge 35 must each be equipped to rotate and hold their positions. To this end, the first banjo hinge 32, second banjo hinge 33, third banjo hinge 34, and fourth banjo hinge 35 each comprise a first disc 36, a second disc 37, and a rotational stop 38, as seen in FIG. 6. The first disc 36 is a disc-shaped base that extends outwardly to enable connection with adjacent members. The second disc 37 is also a disc-shaped base that extends outwardly to enable connection with adjacent members. Together, the first disc 36 and the second disc 37 allow for the respective flexible crossbar to connect to the relevant display-bracing or the respective wall-bracing rod by utilizing ferrules, a friction fit, or other secure connection mechanisms. The rotational stop 38 is a connection that biases the rotation of the first disc 36 relative to the second disc 37. The rotational stop 38 preferably orients the first disc 36 at a 90-degree angle relative to the second disc 37. The first disc 36 and the second disc 37 are concentrically and rotatably connected to each other. This arrangement ensures that the first disc 36 and the second disc 37 share a degree of rotational freedom. The first disc 36 and the second disc 37 are pressed against each other. In this way, friction formed between the first disc 36 and the second disc 37 helps to keep the first disc 36 in a fixed angle position relative to the second disc 37.

The first flexible crossbar 1 is tangentially attached to the first disc 36 of the first banjo hinge 32, as seen in FIG. 1. This attachment is preferably through utilization of a ferrule connection but may also utilize a friction fit or other similar mechanisms. The first display-bracing rod 6 is tangentially attached to the second disc 37 of the first banjo hinge 32. Similarly, ferrules are preferred but not required in this attachment. For the first banjo hinge 32, the rotational stop 38 is operatively integrated between the first disc 36 and the second disc 37, wherein the rotational stop 38 is used to limit the angle between the first flexible crossbar 1 and the first display-bracing rod 6 from exceeding 90 degrees. In this way, the rotational stop 38 can bias the angle between the first disc 36 and the second disc 37 and can consequently bias the angle of the first flexible crossbar 1 and the first display-bracing rod 6 as well.

The second flexible crossbar 2 is tangentially attached to the first disc 36 of the second banjo hinge 33, as seen in FIG. 1. This attachment is preferably through utilization of a ferrule connection but may also utilize a friction fit or other similar mechanisms. The second display-bracing rod 7 is tangentially attached to the second disc 37 of the second banjo hinge 33. Similarly, ferrules are preferred but not required in this attachment. For the second banjo hinge 33, the rotational stop 38 is operatively integrated between the first disc 36 and the second disc 37, wherein the rotational stop 38 is used to limit the angle between the second flexible crossbar 2 and the second display-bracing rod 7 from exceeding 90 degrees. In this way, the rotational stop 38 can bias the angle between the first disc 36 and the second disc 37 and can consequently bias the angle of the second flexible crossbar 2 and the second display-bracing rod 7 as well.

The second flexible crossbar 2 is tangentially attached to the first disc 36 of the third banjo hinge 34, as seen in FIG. 1. This attachment is preferably through utilization of a ferrule connection but may also utilize a friction fit or other similar mechanisms. The first wall-bracing rod 8 is tangentially attached to the second disc 37 of the third banjo hinge 34. Similarly, ferrules are preferred but not required in this attachment. For the third banjo hinge 34, the rotational stop 38 is operatively integrated between the first disc 36 and the second disc 37, wherein the rotational stop 38 is used to limit the angle between the second flexible crossbar 2 and the first wall-bracing rod 8 from exceeding 90 degrees. In this way, the rotational stop 38 can bias the angle between the first disc 36 and the second disc 37 and can consequently bias the angle of the second flexible crossbar 2 and the first wall-bracing rod 8 as well.

The first flexible crossbar 1 is tangentially attached to the first disc 36 of the fourth banjo hinge 35, as seen in FIG. 1. This attachment is preferably through utilization of a ferrule connection but may also utilize a friction fit or other similar mechanisms. The second wall-bracing rod 9 is tangentially attached to the second disc 37 of the fourth banjo hinge 35. Similarly, ferrules are preferred but not required in this attachment. For the fourth banjo hinge 35, the rotational stop 38 is operatively integrated between the first disc 36 and the second disc 37, wherein the rotational stop 38 is used to limit the angle between the first flexible crossbar 1 and the second wall-bracing rod 9 from exceeding 90 degrees. In this way, the rotational stop 38 can bias the angle between the first disc 36 and the second disc 37 and can consequently bias the angle of the first flexible crossbar 1 and the second wall-bracing rod 9 as well.

Although the invention has been explained in relation to its preferred embodiment, it is to be understood that many other possible modifications and variations can be made without departing from the spirit and scope of the invention as hereinafter claimed.

What is claimed is:
1. A flat-screen display wall mount cover comprises:
a first flexible crossbar;
a second flexible crossbar;
a first display-bracing rod;
a second display-bracing rod;
a first wall-bracing rod;
a second wall-bracing rod;
an opaque fabric cover;
the first flexible crossbar and the second flexible crossbar each comprise a proximal end and a distal end;
the first flexible crossbar and the second flexible crossbar being arranged in a crisscross configuration;
the first flexible crossbar being laterally mounted to the second flexible crossbar;
the proximal end of the first flexible crossbar being terminally and hingedly connected to the first display-bracing rod;
the proximal end of the second flexible crossbar being terminally and hingedly connected to the second display-bracing rod;
the distal end of the first flexible crossbar being terminally and hingedly connected to the second wall-bracing rod;
the distal end of the second flexible crossbar being terminally and hingedly connected to the first wall-bracing rod; and
the opaque fabric cover being mounted across the first flexible crossbar, the second flexible crossbar, the first display-bracing rod, the second display bracing rod, the first wall-bracing rod and the second wall-bracing rod, wherein the first display rod, the second display-bracing rod, the first wall-bracing rod and the second wall-bracing rod extend downwardly from the first flexible crossbar and the second flexible crossbar; and wherein the cover protects the gap between a flat-screen display and wall to hide and protect a flat-screen display mount and cable connections without requiring modification of the structure of the flat-screen display or wall.

2. The flat-screen display wall mount cover as claimed in claim 1 comprises:
a central brace;

the first flexible crossbar and the second flexible crossbar each further comprise a midpoint;

the midpoint of the first flexible crossbar and the midpoint of the second flexible crossbar being positioned adjacent to each other; and the midpoint of the first flexible crossbar and the midpoint of the second flexible crossbar being mounted within the central brace.

3. The flat-screen display wall mount cover as claimed in claim 2 comprises:

the central brace comprises a first brace plate, a second brace plate, a first channel, a second channel, and a fastening mechanism;

the first channel being diagonally integrated across the first brace plate;

the second channel being diagonally integrated across the second brace plate;

the first channel and the second channel being arranged in a crisscross configuration;

the first brace plate being mounted across the second brace plate by the fastening mechanism;

the first flexible crossbar being positioned through the first channel; and the second flexible crossbar being positioned through the second channel.

4. The flat-screen display wall mount cover as claimed in claim 3 comprises:

the fastening mechanism comprises at least one first malleable tab and at least one second malleable tab;

the at least one first malleable tab being peripherally connected to the first brace plate;

the at least one first malleable tab being crimped onto the second brace plate;

the at least one second malleable tab being peripherally connected to the second brace plate; and the at least one second malleable tab being crimped onto the first brace plate.

5. The flat-screen display wall mount cover as claimed in claim 1 comprises:

the opaque fabric cover comprises a canvas body, a first pocket, and a second pocket;

the first pocket and the second pocket each comprise an opening;

the first pocket being connected across the canvas body;

the second pocket being connected across the canvas body;

the first pocket and the second pocket being positioned opposite to each other along the canvas body;

the opening of the first pocket and the opening of the second pocket being oriented towards each other;

the first display-bracing rod and the first wall-bracing rod traversing into the first pocket; and the second display-bracing rod and the second wall-bracing rod traversing into the second pocket.

6. The flat-screen display wall mount cover as claimed in claim 5 comprises:

a first width-reducing clip; and the first width-reducing clip being laterally clamped onto the first pocket.

7. The flat-screen display wall mount cover as claimed in claim 5 comprises:

a second width-reducing clip; and the second width-reducing clip being laterally clamped onto the second pocket.

8. The flat-screen display wall mount cover as claimed in claim 1 comprises:

a first display-attaching clip;

a second display-attaching clip;

the first display-attaching clip being braced against the first flexible crossbar;

the second display-attaching clip being braced against the second flexible crossbar; and the first display-attaching clip and the second display-attaching clip being positioned offset from each other.

9. The flat-screen display wall mount cover as claimed in claim 8 comprises:

the first display-attaching clip and the second display-attaching clip each comprise a clip panel, an adhesive, and a crossbar support;

the clip panel comprises a proximal panel face and a distal panel face;

the adhesive being applied across the distal panel face;

the crossbar support being connected onto the proximal panel face;

the first flexible crossbar being situated upon the crossbar support of the first display-attaching clip; and the second flexible crossbar being situated upon the crossbar support of the second display-attaching clip.

10. The flat-screen display wall mount cover as claimed in claim 1, wherein the opaque fabric cover is permeable to infrared radiation.

11. The flat-screen display wall mount cover as claimed in claim 1, wherein the opaque fabric cover is made of a thermally ventilative fabric.

12. The flat-screen display wall mount cover as claimed in claim 1 comprises:

a first banjo hinge; and the first banjo hinge being operatively integrated into the hinged connection between the proximal end of the first flexible crossbar and the first display-bracing rod, wherein the first banjo hinge is used to increase torsional stiffness while adjusting an angle between the first flexible crossbar and the first display-bracing rod.

13. The flat-screen display wall mount cover as claimed in claim 12 comprises:

the first banjo hinge comprises a first disc, a second disc, and a rotational stop;

the first disc and the second disc being concentrically and rotatably connected to each other;

the first disc and the second disc being pressed against each other;

the first flexible crossbar being tangentially attached to the first disc;

the first display-bracing rod being tangentially attached to the second disc; and the rotational stop being operatively integrated between the first disc and the second disc, wherein the rotational stop is used to limit the angle between the first flexible crossbar and the first display-bracing rod from exceeding 90 degrees.

14. The flat-screen display wall mount cover as claimed in claim 1 comprises:

a second banjo hinge; and the second banjo hinge being operatively integrated into the hinged connection between the proximal end of the second flexible crossbar and the second display-bracing rod, wherein the second banjo hinge is used to increase torsional stiffness while adjusting an angle between the second flexible crossbar and the second display-bracing rod.

15. The flat-screen display wall mount cover as claimed in claim 14 comprises:

the second banjo hinge comprises a first disc, a second disc, and a rotational stop;

the first disc and the second disc being concentrically and rotatably connected to each other;

the first disc and the second disc being pressed against each other;

the second flexible crossbar being tangentially attached to the first disc;

the second display-bracing rod being tangentially attached to the second disc; and the rotational stop being operatively integrated between the first disc and the second disc, wherein the rotational stop is used to limit the angle between the second flexible crossbar and the second display-bracing rod from exceeding 90 degrees.

16. The flat-screen display wall mount cover as claimed in claim 1 comprises:

a third banjo hinge; and the third banjo hinge being operatively integrated into the hinged connection between the proximal end of the second flexible crossbar and the first wall-bracing rod, wherein the third banjo hinge is used to increase torsional stiffness while adjusting an angle between the second flexible crossbar and the first wall-bracing rod.

17. The flat-screen display wall mount cover as claimed in claim 16 comprises:

the third banjo hinge comprises a first disc, a second disc, and a rotational stop;

the first disc and the second disc being concentrically and rotatably connected to each other;

the first disc and the second disc being pressed against each other;

the second flexible crossbar being tangentially attached to the first disc;

the first wall-bracing rod being tangentially attached to the second disc; and the rotational stop being operatively integrated between the first disc and the second disc, wherein the rotational stop is used to limit the angle between the second flexible crossbar and the first wall-bracing rod from exceeding 90 degrees.

18. The flat-screen display wall mount cover as claimed in claim 1 comprises:

a fourth banjo hinge; and the fourth banjo hinge being operatively integrated into the hinged connection between the proximal end of the first flexible crossbar and the second wall-bracing rod, wherein the fourth banjo hinge is used to increase torsional stiffness while adjusting an angle between the first flexible crossbar and the second wall-bracing rod.

19. The flat-screen display wall mount cover as claimed in claim 18 comprises:

the fourth banjo hinge comprises a first disc, a second disc, and a rotational stop;

the first disc and the second disc being concentrically and rotatably connected to each other;

the first disc and the second disc being pressed against each other;

the first flexible crossbar being tangentially attached to the first disc;

the second wall-bracing rod being tangentially attached to the second disc; and the rotational stop being operatively integrated between the first disc and the second disc, wherein the rotational stop is used to limit the angle between the first flexible crossbar and the second wall-bracing rod from exceeding 90 degrees.

* * * * *